United States Patent Office.

JOHN JACOB KARLEN, OF ERLENBACH, SWITZERLAND.

Letters Patent No. 101,625, dated April 5, 1870.

IMPROVED COMPOSITION FOR THE MANUFACTURE OF FRICTION MATCHES.

The Schedule referred to in these Letters Patent and making part of the same

I, JOHN JACOB KARLEN, of Erlenbach, in the canton of Bern, Switzerland, have invented a new and improved Match Composition, of which the following is a specification

Nature and Objects of the Invention.

The subject of my invention is a composition, free from phosphorus, for the manufacture of friction matches, which may be ignited upon any rubbing surface.

General Description.

My match composition is made of the following ingredients:

Hyposulphite of lead, thirty-five parts.
Chlorate of potassa, twenty parts.
Bichromate of potassa, one part.
Roll sulphur, (well pulverized,) one part.
Peroxide of manganese, (best kind,) one part.
Peroxide of lead, one part.
Powdered glass, fifteen parts.
Gelatine, (glue,) three parts.

The bichromate of potassa is first dissolved in cold water, and put into a dish. To this solution is next added the hyposulphite of lead, then the chlorate of potassa, then the sulphur, then the peroxide of manganese, and finally the peroxide of lead, all in the order stated. These six materials are then well mixed and kneaded together with water, to form a thick paste, which is then rubbed upon a slab or passed through a mill, such as is used for grinding paints, so that all the ingredients are intimately and thoroughly blended. The paste is then warmed in a bath of lukewarm, but not hot water.

The gelatine or glue having been dissolved in somewhat warmer water, this solution and the powdered glass are added to the former mixture, and the whole mingled together in the form of a paste, which is then well stirred for a quarter of an hour, when the composition is ready for dipping the match-sticks.

If the dipping is to be performed at a future time, the composition may be allowed to cool, and when subsequently wanted for use can be readily and quickly rendered fluid by means of a warm-water bath, not too hot. The dipping can then be performed as well as before, and the composition is not in any manner impaired.

The matches are then allowed to dry in a temperature of from 15° to 20° of Reaumer for twelve hours.

The hyposulphite of oxide of lead is to be prepared as follows: Sixteen (16) parts of nitrate of lead and eleven (11) parts of hyposulphite of soda are each dissolved separately in a large quantity of quite hot water. The one solution is then poured into the other, and there is immediately formed a white precipitate, which is allowed to remain undisturbed until it has fully settled, when the warm water is poured off, and the precipitate is washed six or eight times with cold water. This being done, the precipitate, which is hyposulphite of oxide of lead, is put into a filtering bag and allowed to drain there, after which it is well pressed and dried, not on a stove nor in the sun, but preferably in a current of air.

It is important that the chlorate of pottassa be ground very fine, even to an impalpable powder. The glass should not be so finely pounded.

The quantity of water to be used in the composition is to be determined by trial, water being added in small quantities until the paste acquires just the right consistency. If too much water is used, the heads or caps of the matches are liable to come off.

These matches ignite readily by friction on a common match-box or any suitable rubbing-surface, as stone, glass, porcelain, wood, &c.

Aniline color dissolved in alcohol may be used to color the composition, if desired.

Claim.

I claim as my invention—

The match composition constituted substantially as above set forth

To the above specification of my invention I have signed my hand this 2d day of October, 1869.

J. J. KARLEN.

Witnesses:
J. J. RINDER,
IS. RICDERG.